Patented June 10, 1952

2,599,771

UNITED STATES PATENT OFFICE 2,599,771

GELS OF CARBOXYALKYL ETHERS OF CARBOHYDRATE GUMS

Owen A. Moe, Minneapolis, Minn., assignor to General Mills, Inc., a corporation of Delaware No Drawing. Application July 19, 1950, Serial No. 174,785

13 Claims. (Cl. 260—209)

The present invention relates to gels of carboxyalkyl ethers of carbohydrate gums and to methods of producing the same. This application is a continuation-in-part of my copending application Serial No. 664,987, filed April 25, 1946, now Patent No. 2,510,161 which in turn is a continuation-in-part of my application Serial No. 612,717, filed August 25, 1945, now Patent No. 2,477,544.

In the above mentioned applications there are disclosed novel carboxyalkyl ethers of carbohydrate gums and alkali metal salts thereof which are readily dispersible and form sols of excellent clarity. The present application is concerned with gels formed from sols of these carboxyalkyl ethers.

The invention is applicable to carbohydrate gums selected from the group consisting of galactomannan and glucomannan gums. These gums are polysaccharides composed principally of galactose and mannose units and glucose and mannose units respectively. The galactomannans are usually found in the endosperm of leguminous seeds such as guar, locust bean, honey locust, flame tree, *Cassia occidentalis*, and the like. The glucomannans on the other hand, are usually found in the corms of plants of the Araceae family such as *Amorphophallus oncophyllus*, from which the product known as iles mannan is obtained, and *Amorphophallus rivieri* from which knonnyaku flour is obtained.

Aqueous sols of the carboxyalkyl ethers of these gums are capable of forming gels on the addition of an aqueous solution of salts of polyvalent metals such as ferrous sulfate, aluminum sulfate, aluminum chloride, and the like. These gels are very firm and can be transferred from one container to another without wetting the surface with which they come in contact.

It is therefore a primary object of the present invention to provide gels of carboxyalkyl ethers of carbohydrate gums selected from the group consisting of galactomannan and glucomannan gums.

It is a further object of the present invention to provide a process of producing such gels.

The carboxyalkyl ethers may be formed by treating the gum with a cold aqueous solution of an alkali such as sodium hydroxide, and then treating the alkali gum with a halo fatty acid or a halo fatty acid salt such as sodium chloroacetate, sodium chloropropionate, sodium chlorobutyrate, and other halo fatty acids or salts thereof. In general, the treatment of the gum with a cold solution of alkali serves to disperse the gum without the occurrence of lumping. It is also possible to disperse the gum in aqueous alkali at a more elevated temperature by a more efficient stirring means. After dispersion of the gum in aqueous alkali, the mixture is heated to an elevated temperature such as 60–90° C. and the reaction mixture will then frequently become semi-solid. This mass is then cooled and broken up into fine particles and treated with the etherifying agent. This reaction mixture is then heated to a temperature of 80–85° C. for an appreciable period of time, 1 to 2 hours, with efficient mixing. The reaction mixture is then cooled and diluted with water and made acid to phenolphthalein. The reaction product may then be precipitated by the addition of a water miscible organic solvent such as methanol, acetone, and the like, and may be washed with a similar mixture of water and organic solvent for further removal of impurities, and then dried and ground.

Another method of making the carboxyethyl and substituted carboxyethyl derivatives of the galactomannan and glucomannan type gums is as follows: The gums are dispersed in an alkaline solution and then reacted with acrylonitrile or substituted acrylonitriles such as methacrylonitrile. This reaction results in a cyanoethyl ether of the gum which can then be hydrolyzed in any suitable manner to produce the carboxyethyl gum ether or the alkali metal salts thereof.

In forming the gels the carboxyalkyl ether of the gum is dispersed in water to produce a sol. Low concentration sols of from about 1% to 3% of the carboxyalkyl ether are preferred. To these sols there is added an aqueous solution of a polyvalent metal salt and the resultant mixture is stirred to produce a gel. Wide variation is possible both in concentrations of the sols and the salt solution and also in the relative ratios of these reactants. It is also possible to vary the nature of the gel from a soft gel to a very firm gel by varying the quantities and the concentrations of the reactants. By routine examination it is possible to determine the concentrations and proportions of reactants for the production of any desired type of gel with any particular sol.

*Example 1*

1.2 grams of sodium carboxyethyl ether of guar gum were dissolved in 75 grams of water to yield a clear solution. The pH of the solution was adjusted to 6.6 with acetic acid. The resultant solution was then divided into three equal portions. To one portion was added an aqueous solution of ferrous sulfate and the mixture was stirred, whereupon a gel resulted.

To a second portion was added an aqueous solution of aluminum sulfate and a gel resulted upon stirring.

To a third portion was added an aqueous solution of aluminum chloride and a gel resulted upon stirring.

*Example 2*

To a series of 25 g. samples of a 2% sodium carboxymethyl guar gum solution were slowly added varying quantities of 10% aqueous ferrous sulfate solution with complete stirring. Desirable gel formation occurred in the samples to which from 5 to 15 cc. of ferrous sulfate solution had been added with the best type gel being obtained at from 8 to 10 cc.

Similar results were obtained when a ferrous sulfate solution was added all at once with efficient stirring to the point where gelation occurred.

*Example 3*

To four 10 gram samples of 3% aqueous sodium carboxymethyl guar gum were added various amounts of 10% ferrous sulfate, stirring being applied only until the materials were thoroughly mixed and gelation occurred. It was found that best results were obtained by the use of from 3 to 5 cc. of ferrous sulfate, and that gels could be obtained up to 12 cc., but these were not as desirable as those produced with lower quantities of ferrous sulfate.

*Example 4*

To 10 gram samples of 3% aqueous solution of sodium carboxymethyl guar gum were added varying quantities of 20% aqueous ferrous sulfate solution. It was found that exceptionally good gels were obtained with from 1½ to 2½ cc. of the ferrous sulfate solution, and a very good gel was obtained at 4 cc. of ferrous sulfate solution, and that acceptable gels were still formed at 6 cc. of ferrous sulfate solution. Furthermore it was noted that these gels were firmer than the gels of Example 3, possibly due to the fact that in Example 3 gels were more dilute.

*Example 5*

A 3% aqueous solution of sodium carboxymethyl guar gum was prepared and to portions of this solution were added aqueous solutions of aluminum chloride, aluminum sulfate, ferric chloride, and ferrous sulfate. Gels were produced in each sample.

*Example 6*

Forty parts of locust bean gum were dispersed in 150 parts of 7% sodium hydroxide solution cooled to 0° C. The alkali-gum mixture was heated in a water bath to 80° C. and the reaction mixture became semi-solid. The resulting mass was firm and rubbery-like. After cooling, this mass was broken up into fine particles and the solution of the sodium chloracetate (23.5 parts of chloracetic acid in 50 parts of water was neutralized with 10 parts of sodium hydroxide in 20 parts of water) was added with efficient mixing. The resulting reaction mixture was heated in a water bath to 80–85° C. for a period of 90 minutes with efficient mixing. After cooling, the reaction mixture was diluted with 200 cc. of water and made acidic to phenolphthalein by addition of dilute acetic acid. The reaction product was precipitated by the addition of methanol. The precipitated product thus obtained was washed with methanol, dried and ground to a powder. The sodium carboxymethyl ether of locust bean gum thus prepared was readily dispersible in water to form 1% sols of remarkable clarity and stability and of a viscosity comparable to or higher than that of the gum itself. A 3% sol of very good clarity and high viscosity was very readily obtained. These sols formed gels which were firm when a solution of a metallic salt such as ferrous sulfate was added. The gels may be prepared in the following manner: Three to five parts of a 10% ferrous sulfate solution are added to 10 parts of a 3% carboxymethyl gum ether sol with efficient mixing. The gel formation takes place rapidly as the sol is stirred. It is, of course, apparent that the concentration of the ferrous sulfate and gum derivative sols may be varied over a wide range.

*Example 7*

Twenty parts of iles mannan flour were easily dispersed uniformly in 60 parts of 33% sodium hydroxide solution cooled to 0° C. This alkali-gum mixture was heated in a water bath and a solid, rubber-like mixture resulted. This solid, rigid, yet rubber-like mass was cooled and ground into fine particles. Then 22 parts of chloracetic acid were mixed in well with cooling. After the addition of the etherifying agent was completed, the resulting reaction mixture was heated in a water bath to 80° C. and maintained at this temperature for a period of 90 minutes. The mixture was made acidic to phenolphthalein, cooled and diluted with 300 parts of water. The reaction mixture had a dark color which was removed by precipitating the reaction product with methanol. The precipitated product was treated in a usual manner. This sodium carboxymethyl gum ether was readily dispersible in cold water to yield viscous 2–4% sols of good clarity and stability. This product also showed the gel formation on the addition of a dilute ferrous sulfate solution. However, the tendency towards this gel formation was not as pronounced as in the case of the derivative from locust bean gum and guar gum.

While these specific examples have been with particular reference to various salts of iron and aluminum, other polyvalent metal salts may be used for the production of gels. Different concentrations of the carboxyalkyl ether derivatives and the salt solutions, as well as the quantities thereof, may be preferred, and the optimum conditions can readily be determined by simple investigation.

I claim as my invention:

1. A gel comprising the reaction product of an aqueous sol of a carboxyalkyl ether of a gum selected from the group consisting of galactomannan and glucomannan gums, and a soluble polyvalent metal salt selected from the group consisting of iron and aluminum salts.

2. A gel comprising the reaction product of an aqueous sol of a carboxyalkyl ether of a gum selected from the group consisting of galactomannan and glucomannan gums, and a soluble aluminum salt.

3. A gel comprising the reaction prodct of an aqueous sol of a carboxyalkyl ether of a gum selected from the group consisting of galactomannan and glucomannan gums, and a soluble iron salt.

4. A gel comprising the reaction product of an an aqueous sol of a carboxyalkyl ether of a gum selected from the group consisting of galactomannan and gulcomannan gums, and aluminum sulfate.

5. A gel comprising the reaction product of an aqueous sol of a carboxyalkyl ether of a gum selected from the group consisting of galactomannan and glucomannan gums, and ferrous sulfate.

6. A gel comprising the reaction product of an aqueous sol of a carboxymethyl ether of a galactomannan gum and ferrous sulfate.

7. A gel comprising the reaction product of an aqueous sol of a carboxyethyl ether of a galactomannan gum and ferrous sulfate.

8. A gel comprising the reaction product of an aqueous sol of a carboxymethyl ether of a galactomannan gum and aluminum sulfate.

9. A gel comprising the reaction product of an aqueous sol of a carboxyethyl ether of a galactomannan gum and aluminum sulfate.

10. Process of producing a gel comprising preparing an aqueous sol of a carboxyalkyl ether of a gum selected from the group consisting of galactomannan and glucomannan gums, and adding thereto an aqueous solution of a soluble polyvalent metal salt selected from the group consisting of iron and aluminum salts.

11. Process of producing a gel comprising preparing an aqueous sol of a carboxyalkyl ether of a gum selected from the group consisting of galactomannan and glucomannan gums, and adding thereto an aqueous solution of aluminum sulfate.

12. Process of producing a gel comprising preparing an aqueous sol of a carboxyalkyl ether of a gum selected from the group consisting of galactomannan and glucomannan gums, and adding thereto an aqueous solution of ferrous sulfate.

13. Process of producing a gel comprising preparing an aqueous sol of a carboxyalkyl ether of a gum selected from the group consisting of galactomannan and glucomannan gums, and mixing said sol with a polyvalent metal salt selected from the group consisting of iron and aluminum salts.

OWEN A. MOE.

REFERENCES CITED

The following references are of record in the file of this patent:

UNITED STATES PATENTS

| Number | Name | Date |
|---|---|---|
| 2,144,522 | Braun | Jan. 17, 1939 |
| 2,520,161 | Moe | Aug. 29, 1950 |

OTHER REFERENCES

Mantell, Water Soluble Gums, 1947, pages 234–235 citing Jacobs et al., Ind. Eng. Chem. Anal. Ed. 3, 210–12 (1931).

Chem. Abst., vol. 43 (1949), p. 8717.